(12) United States Patent
Jonasson

(10) Patent No.: US 6,415,635 B1
(45) Date of Patent: Jul. 9, 2002

(54) LOCKING DEVICE FOR A HELMET

(75) Inventor: Lars Jonasson, Genvägen 1, S-761 40 Norrtälje (SE)

(73) Assignees: Lars Jonasson, Norrtalje; Ake Persson, Stockholm, both of (SE)

( * ) Notice: Subject to any disclaimer, the term of this patent is extended or adjusted under 35 U.S.C. 154(b) by 0 days.

(21) Appl. No.: 09/647,147

(22) PCT Filed: Mar. 23, 1999

(86) PCT No.: PCT/SE99/00448

§ 371 (c)(1),
(2), (4) Date: Sep. 27, 2000

(87) PCT Pub. No.: WO99/50132

PCT Pub. Date: Oct. 7, 1999

(30) Foreign Application Priority Data

Mar. 27, 1998 (SE) ............................................. 9801061

(51) Int. Cl.[7] ............................................. E05B 69/00
(52) U.S. Cl. .................. 70/59; 70/39; 70/53; 70/62; 70/233; 248/553
(58) Field of Search ....................... 70/233–235, 57–59, 70/53, 62, 258, 32, 30, 49, 38 A, 38 R, 39; 248/553; 224/413, 427

(56) References Cited

U.S. PATENT DOCUMENTS

| 3,581,531 A | | 6/1971 | Hediger ........................ 70/59 |
| 3,781,861 A | * | 12/1973 | Adler, Jr. et al. ......... 70/233 X |
| 3,798,934 A | * | 3/1974 | Wright et al. ................... 70/59 |
| 4,676,080 A | * | 6/1987 | Schwarz ......................... 70/59 |
| 5,291,765 A | * | 3/1994 | Hoisington .................. 70/233 |
| 5,664,444 A | | 9/1997 | Schaan ........................... 70/14 |
| 5,709,113 A | * | 1/1998 | Godfrey ................... 70/227 X |

FOREIGN PATENT DOCUMENTS

| CA | 2 132 996 | | 3/1996 | |
| DE | 3141766 | * | 6/1982 | .................... 70/59 |
| EP | 0 760 333 A2 | | 3/1997 | |

* cited by examiner

Primary Examiner—Lloyd A. Gall
(74) Attorney, Agent, or Firm—Young & Thompson

(57) ABSTRACT

A device for locking a bicycle helmet to a bicycle, the helmet comprising a helmet shell (19) having a through-going hole (20). A lock case (4) is fixedly mounted on a frame rod (2), the frame rod being arranged to support the saddle (1) of the bicycle. A longitudinal locking element (11) at both ends has a lock head (10), the lock head (10) may be locked in the lock case. The locking element (11) is arranged to extend through the hole (20) of the helmet shell in order to have its lock head (10) locked in the lock case (4) and thus securing the helmet to the bicycle.

8 Claims, 1 Drawing Sheet

LOCKING DEVICE FOR A HELMET

BACKGROUND OF THE INVENTION

The invention relates to a device for locking a helmet to a bicycle, said helmet including a helmet shell having at least one through-going hole.

A cyclist should use a helmet in connection with the use of his/her bicycle. When the cyclist temporarily leaves his/her parked bicycle in order to do an errand of some sort it is often inconvenient to carry the helmet along. On the other hand there is a non-acceptable risk that the helmet becomes stolen if it is left with the parked bicycle without being locked to said bicycle. Certainly there are locking wire cables and locks available in the market, said devices allowing a temporary locking of the bicycle helmet to the bicycle, e.g. by running the wire cable through a hole in the helmet shell and through a closed loop on the bicycle before the ends of the wire cable are locked together. In connection with such a locking device there is still the problem with storing the locking device between the occasions of use.

The object of the invention is to realise a locking device that allows simple storing, in a space-saving way, of the locking device between the occasions of use, said locking device still allowing a quick and simple locking of the helmet to the bicycle when needed.

This object is realised by means of a device according to the appended claim 1.

Embodiments of the device are defined in,the appended independent claims.

According to a practical embodiment of the invention a locking rod, bent to L-shape, is provided, said locking rod thus having a short rod shank and a long rod shank. At each end of the rod a lock head is provided. A lock case is mounted, about longitudinally midways, on the frame pole of the bicycle, said frame pole supporting the saddle of the bicycle.

The lock case has an essentially forwardly extending and forwardly opening receiving channel for a lock head. The lock head, at each end of the rod, extends in direction of the adjoining end portion of the rod. The lock case is of a type that releases the lock head by being opened with an adherent key. Further, the lock case is preferably designed to receive, in a supporting way, a lock head by simply having said lock head axially inserted into the lock case.

Thanks to the L-shape of the rod, the long shank of the rod may extend downwards or upwards, generally parallel to the frame pole that supports the saddle, when the rod is not used for securing the helmet and when the short shank of the rod is locked in the lock case. On the contrary, when the rod is to be used for locking the helmet, it is released from the lock case and then its long shank is inserted through the opening or a pair of openings in the helmet shell, and subsequently the lock head of the long rod portion is pushed into the lock case.

The bent portion between the shanks of the rod may possibly be widened in order to prevent a pulling of the bicycle helmet off the locking rod secured to the bicycle, especially when the opening in the helmet shell is in the shape of an elongated slot.

According to a different embodiment a flexible cable or wire may have one end secured to the bicycle (e.g. secured to the lock case), while its other end supports a lock head that may be clamped in the lock case. In such a case the cable is inserted through the hole of the helmet shell before it is secured by means of its head in the lock case.

The invention will be described below by means of examples, reference being made to the enclosed drawing.

DETAILED DESCRIPTION OF THE INVENTION

Figure 1:
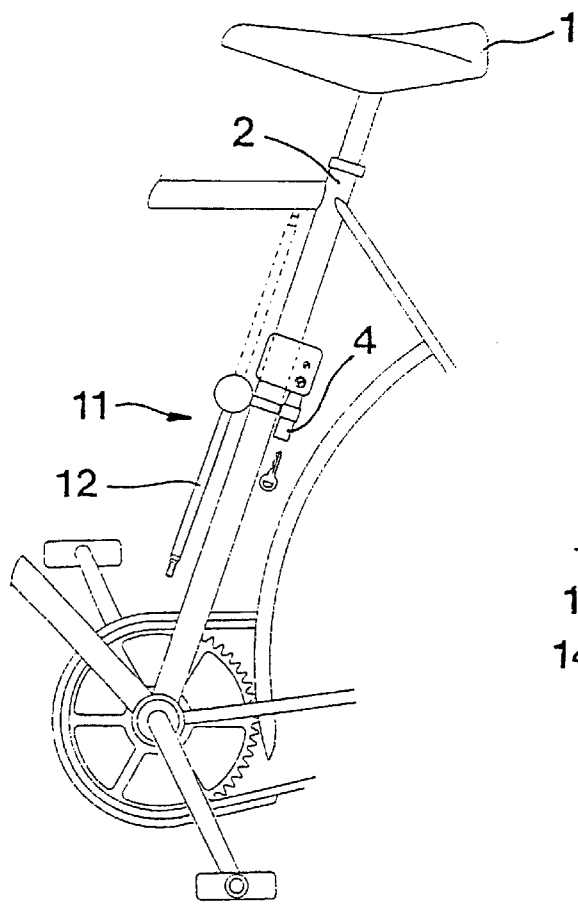
FIG. 1 shows schematically a side view of the rear portion of a bicycle having a locking device according to the invention.

In FIG. 1 the rear portion of a bicycle is shown, said bicycle having a saddle 1 and a saddle supporting pole 2 of the bicycle frame, said pole 2, in the travelling direction, about midways between the crank boss and the saddle attachment (or a forwardly extending horizontal frame piece of a man's bicycle) being provided with a fixedly mounted lock case 4 having a forwardly extending receiving channel for a lock head 10 at the end of a locking element 11 that is shown in the shape of a bar 11. Said locking element 11 is bent to generally L-shape and thus includes a long shank 12 and a short shank 13. In the transition area between the shanks 12, 13 there is a material enlargement 14 whose cross-sectional dimensions are larger than the smallest cross-sectional dimension for an opening 20 through a bicycle helmet shell 19.

Figure 2:
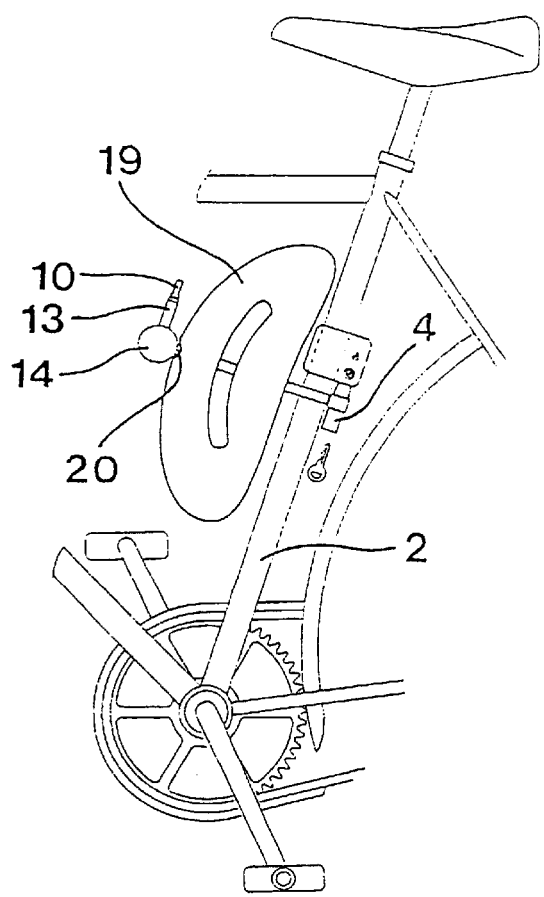
FIG. 2 shows a portion of the object of FIG. 1, a helmet being locked to the bicycle by means of the locking device.
Figure 3:
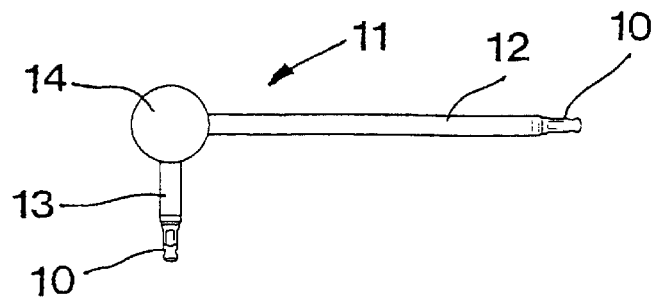
FIG. 3 shows a view of a locking element included in the helmet locking device.

In the state of the locking device according to FIG. 1 the head 10 of the short bar shank 13 is inserted into the lock case 4 and locked therein, said long bar shank 12 extending downwards, essentially parallel to, adjacent to and behind the frame pole 2. As is shown by dotted lines the shank 12 may also extend upwards along the bar 2. When a bicycle helmet is to be locked to the bicycle by means of the locking device, the bar 11 is released from the lock case 4 by having the lock of the lock case (said lock may constitute,a key lock or a code lock) opened. Then the long shank 12 of the bar 11 is inserted through an opening 20 of the helmet shell 19, as is shown in FIG. 2, and then the lock head 10 of the long bar shank 12 is inserted into the lock case 4 and locked therein. If the opening 20 is elongated a pulling of the helmet 19 from the bar 11, said bar 11 being locked in the lock case, is prevented by said enlarged material portion 14. The portion 14 is larger than the smallest dimension of the opening 20.

The lock head and the lock case may be designed to lock the bar 11 having its shank 12 in parallel relation to the pole 2. The lock case 4 may be located at either side of the pole 2 or in front of the pole 2. Since the material enlargement 14 (the stop cube) has a determinant function, the bar/element 11 does not need to be rigid. However, it should be angled in such a way that its long shank 12 may be located adjacent to the pole 2 when the short shank 13 is inserted into the lock case 4. Said element may therefore constitute a flexible material like a piece of steel wire having an enlarged ball 14 at the bent area.

What is claimed is:

1. Device for locking a bicycle helmet to a bicycle, said helmet comprising a helmet shell (19) having a through-going hole (20), that a lock case (4) is adapted to be fixedly mounted on a frame rod (2), and that a longitudinal locking element (11) is arranged to be inserted through the hole (20) of the helmet shell in order to have a lock head (10) at one end of said longitudinal locking element (11) locked in the lock case (4), thereby the helmet being secured to the bicycle, characterized in that the locking element (11) at both ends has a lock head (10) adapted to be locked in the lock case (4), that the locking element (11) has a first short shank (13) that is bent about 90° relative to a second long shank (12) of the locking element (11), said long shank (12) being inserted through the hole (20) of the helmet shell and secured in the lock case (4) by means of its lock head (10).

2. Device according to claim 1, characterized in that the locking element (11) is provided with a material enlargement (14) in the transition area between the shanks (12, 13).

3. Device according to claim 1, characterized in that the lock case (4) has a channel extending generally perpendicular to the rod (2), said channel receiving the lock head (10) that has a generally coaxial extension to the shank (12, 13) carrying the lock head (10).

4. Device according to claim 1, characterized in that the rod constitutes a frame pole (2) that is arranged to support the saddle (1) of the bicycle, and that the lock case (4) has a generally horizontally extending channel facing forwardly in the direction of travel of the bicycle.

5. Device according to claim 4, characterized in that the lock case (4) is arranged to secure the locking element (11) at an orientation where the locking element (11) extends essentially in the plane of the frame.

6. Device according to claim 2, characterized in that the lock case (4) has a channel extending generally perpendicular to the rod (2), said channel receiving the lock head (10) that has a generally coaxial extension to the shank (12, 13) carrying the lock head (10).

7. Device according to claim 2, characterized in that the rod constitutes a frame pole (2) that is arranged to support the saddle (1) of the bicycle, and that the lock case (4) has a generally horizontally extending channel facing forwardly in the direction of travel of the bicycle.

8. Device according the claim 7, characterized in that the lock case (4) is arranged to secure the locking element (11) at an orientation where the locking element (11) extends essentially in the plain of the frame.

* * * * *